United States Patent
Fowe et al.

(10) Patent No.: US 10,304,331 B2
(45) Date of Patent: May 28, 2019

(54) METHOD AND APPARATUS FOR DETERMINING AN ESTIMATED TRAFFIC CONGESTION STATUS OF A TUNNEL BASED ON PROBE DATA

(71) Applicant: HERE Global B.V., Veldhoven (NL)

(72) Inventors: James Fowe, Chicago, IL (US); Finn Swingley, Chicago, IL (US)

(73) Assignee: HERE Global B.V., Veldhoven (NL)

( * ) Notice: Subject to any disclaimer, the term of this patent is extended or adjusted under 35 U.S.C. 154(b) by 491 days.

(21) Appl. No.: 14/750,703

(22) Filed: Jun. 25, 2015

(65) Prior Publication Data

US 2016/0379488 A1 Dec. 29, 2016

(51) Int. Cl.
G08G 1/052 (2006.01)
G01C 21/30 (2006.01)
G08G 1/01 (2006.01)

(52) U.S. Cl.
CPC ............ G08G 1/052 (2013.01); G01C 21/30 (2013.01); G08G 1/0112 (2013.01); G08G 1/0133 (2013.01)

(58) Field of Classification Search
None
See application file for complete search history.

(56) References Cited

U.S. PATENT DOCUMENTS

| | | | | |
|---|---|---|---|---|
| 6,532,432 | B1 * | 3/2003 | Nagatsuma | G01C 22/02 702/142 |
| 2006/0178798 | A1 | 8/2006 | Chen | |
| 2013/0103290 | A1 * | 4/2013 | Hardin | G08G 1/0112 701/117 |

(Continued)

FOREIGN PATENT DOCUMENTS

WO 2008035721 A1 3/2008

OTHER PUBLICATIONS

Friedrich et al., "Automatic number plate recognition for the observance of travel behavior", 8th International Conference on Survey Methods in Transport, May 25-31, 2008, retrieved on Aug. 3, 2015 from http://www.isv.uni-stuttgart.de/vuv/publication/downloads/200805_Fr_PJ_JS-ANPR.pdf, pp. 1-17.

Notification of Transmittal of the International Search Report and the Written Opinion of the International Searching Authority, or the Declaration; International Search Report and Written Opinion for corresponding International Application No. PCT/EP2016/064749, dated Oct. 20, 2016, 13 Pages.

*Primary Examiner* — Hussein Elchanti
*Assistant Examiner* — Paul A Castro
(74) *Attorney, Agent, or Firm* — Ditthavong & Steiner, P.C.

(57) ABSTRACT

An approach is provided for determining tunnel speed for a vehicle travelling through a tunnel. A tunnel processing platform aggregates probe data associated with at least one vehicle into at least one tunnel path based, at least in part, on a network geometry topology for at least one tunnel. The tunnel processing platform also designates at least one probe point collected upstream of the at least one tunnel as at least one starting point of the at least one tunnel path and at least one temporary probe point as at least one endpoint of the at least one tunnel path, wherein the at least one temporary probe point is downstream of the at least one tunnel. It then determines at least one temporary tunnel speed for the at least one tunnel path based, at least in part, on the timestamp for the at least one probe point and the current time associated with the at least one temporary probe point.

17 Claims, 12 Drawing Sheets

(56) References Cited

U.S. PATENT DOCUMENTS

2013/0253811 A1* 9/2013 Miyajima ............ G08G 1/0112
　　　　　　　　　　　　　　　　　　　　　701/118

* cited by examiner

100

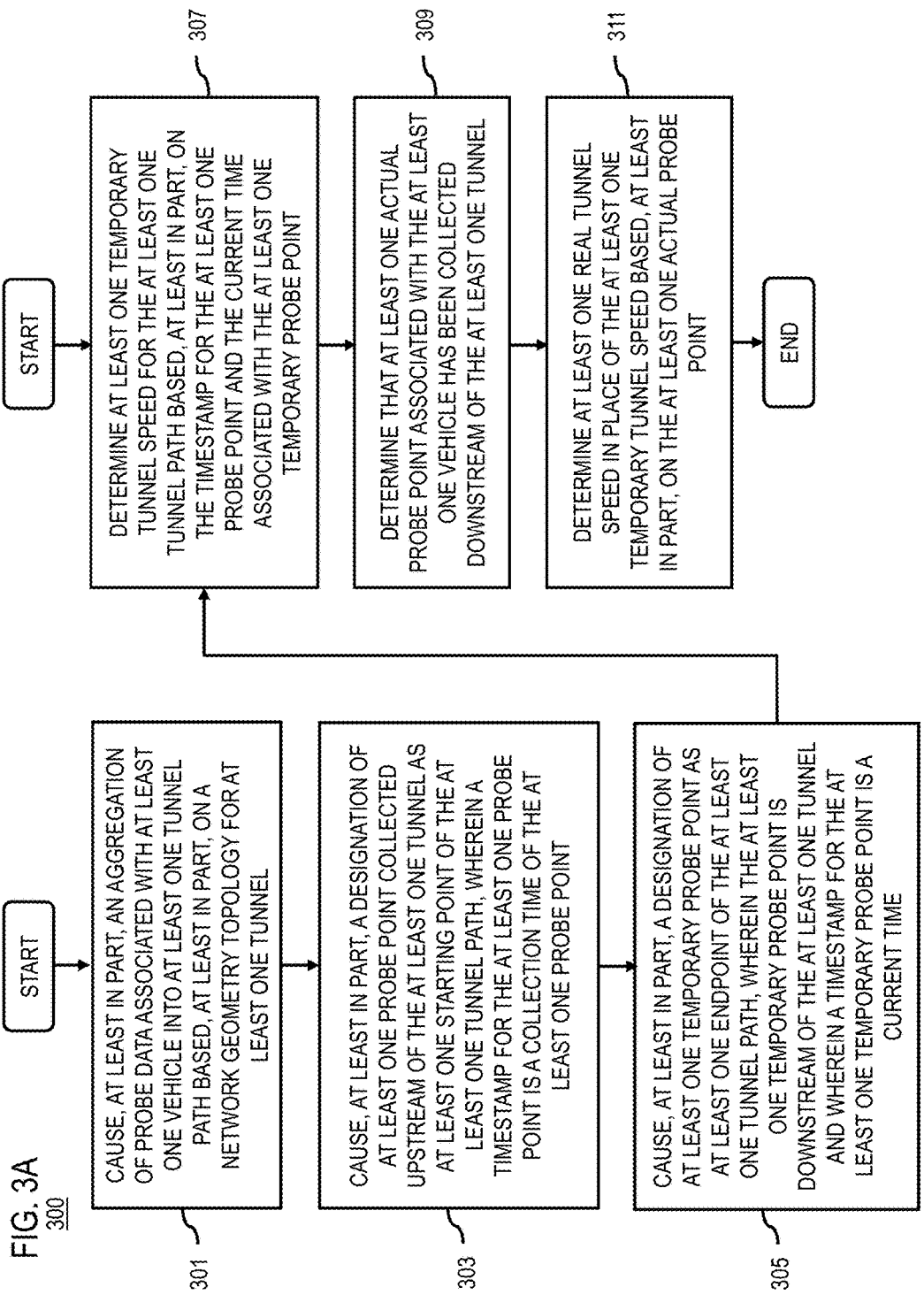

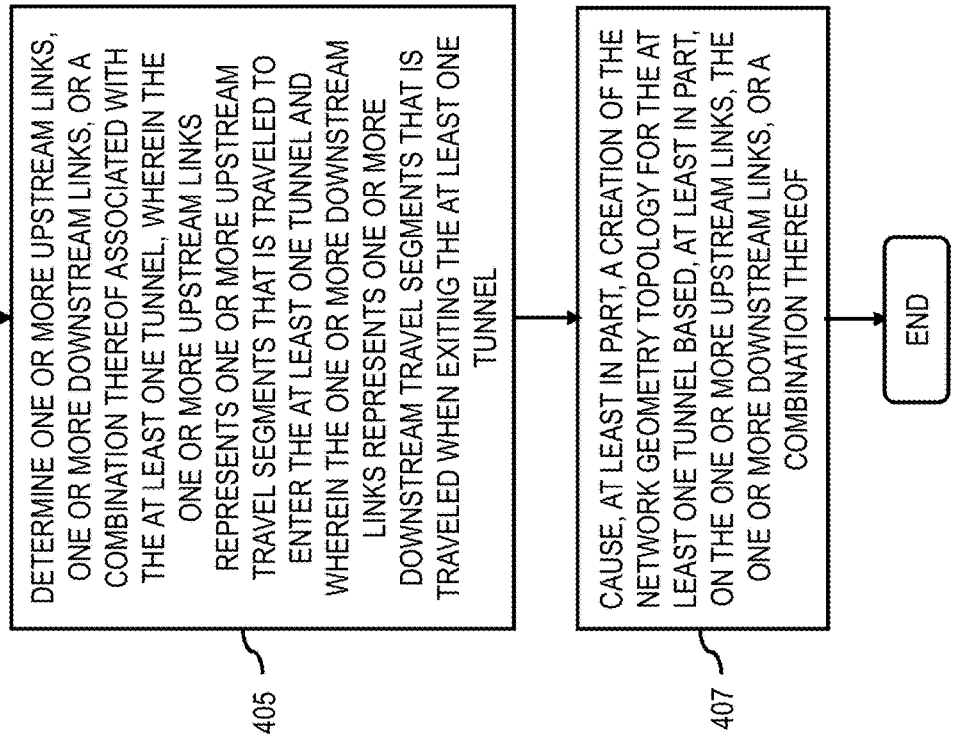
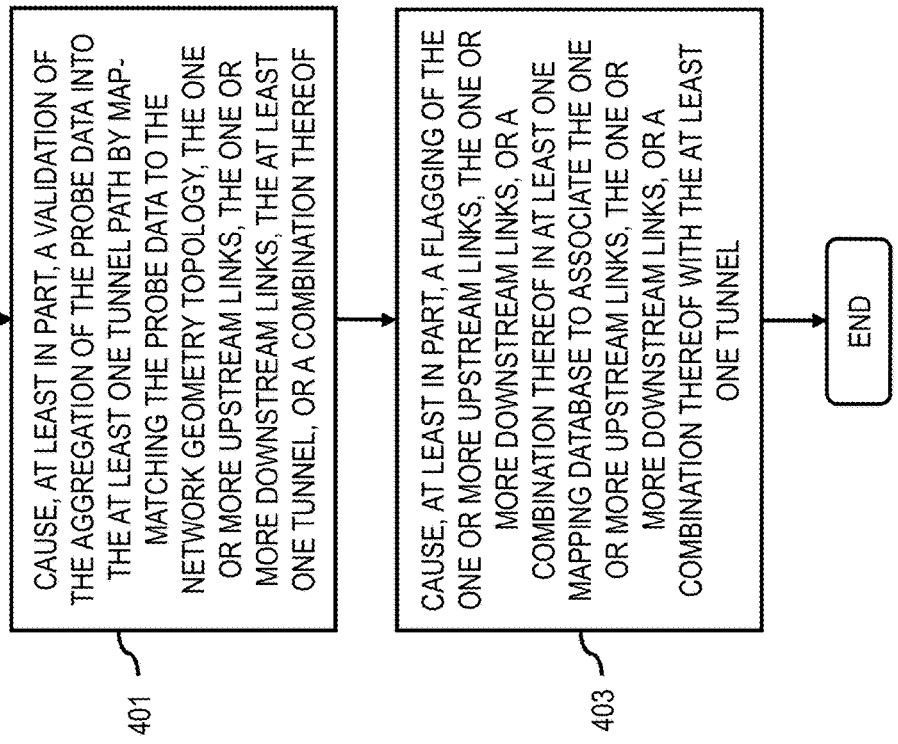

501

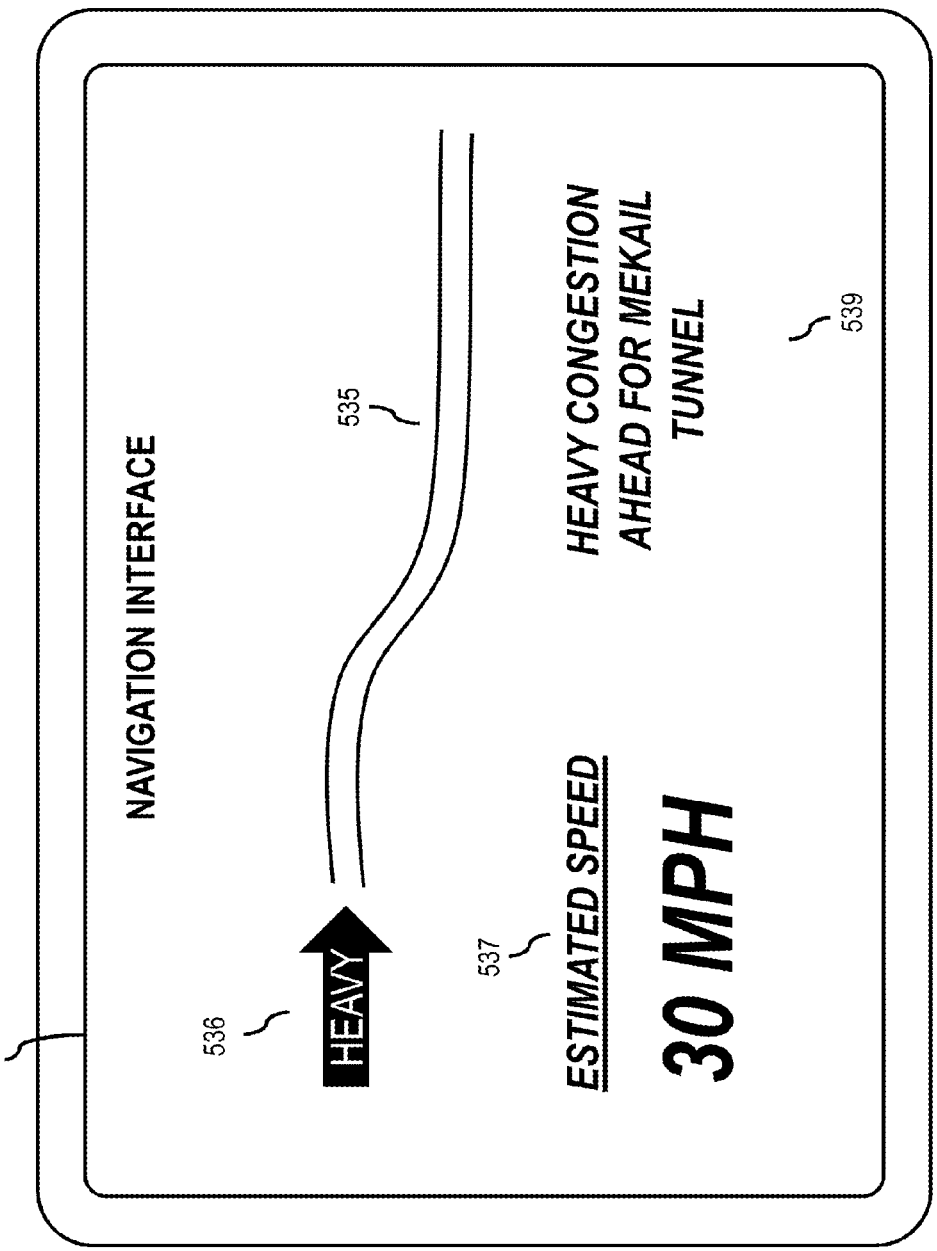

METHOD AND APPARATUS FOR DETERMINING AN ESTIMATED TRAFFIC CONGESTION STATUS OF A TUNNEL BASED ON PROBE DATA

BACKGROUND

Service providers and device manufacturers (e.g., wireless, cellular, etc.) are continually challenged to deliver value and convenience to consumers by, for example, providing compelling network services. One area of interest has been the development of services for tracking vehicles as they drive along roadways and/or navigate to different destinations, including global positioning system (GPS) based services. For example, a mapping service may collect and process GPS probe data shared during driving of a vehicle to determine the vehicle's location and generate corresponding mapping or routing data. Unfortunately, GPS satellite signals are lost when a vehicle travels into tunnels or underground roadways. Resultantly, services that rely on the analysis of this GPS probe data for navigation processing are unable to determine the speed of vehicles or access real-time traffic conditions as vehicles travel through tunnels.

SOME EXAMPLE EMBODIMENTS

Therefore, there is a need for an approach for determining tunnel speed for a vehicle travelling through a tunnel.

According to one embodiment, a method comprises causing, at least in part, an aggregation of probe data associated with at least one vehicle into at least one tunnel path based, at least in part, on a network geometry topology for at least one tunnel. The method also comprises causing, at least in part, a designation of at least one probe point collected upstream of the at least one tunnel as at least one starting point of the at least one tunnel path, wherein a timestamp for the at least one probe point is a collection time of the at least one probe point. The method also comprises causing, at least in part, a designation of at least one temporary probe point as at least one endpoint of the at least one tunnel path, wherein the at least one temporary probe point is downstream of the at least one tunnel and wherein a timestamp for the at least one temporary probe point is a current time. The method further comprises determining at least one temporary tunnel speed for the at least one tunnel path based, at least in part, on the timestamp for the at least one probe point and the current time associated with the at least one temporary probe point.

According to another embodiment, an apparatus comprises at least one processor, and at least one memory including computer program code for one or more computer programs, the at least one memory and the computer program code configured to, with the at least one processor, cause, at least in part, the apparatus to cause, at least in part, an aggregation of probe data associated with at least one vehicle into at least one tunnel path based, at least in part, on a network geometry topology for at least one tunnel. The apparatus also causes, at least in part, a designation of at least one probe point collected upstream of the at least one tunnel as at least one starting point of the at least one tunnel path, wherein a timestamp for the at least one probe point is a collection time of the at least one probe point. The apparatus also causes, at least in part, a designation of at least one temporary probe point as at least one endpoint of the at least one tunnel path, wherein the at least one temporary probe point is downstream of the at least one tunnel and wherein a timestamp for the at least one temporary probe point is a current time. The apparatus is further caused to determine at least one temporary tunnel speed for the at least one tunnel path based, at least in part, on the timestamp for the at least one probe point and the current time associated with the at least one temporary probe point.

According to another embodiment, a computer-readable storage medium carries one or more sequences of one or more instructions which, when executed by one or more processors, cause, at least in part, an apparatus to cause, at least in part, an aggregation of probe data associated with at least one vehicle into at least one tunnel path based, at least in part, on a network geometry topology for at least one tunnel. The apparatus is also caused, at least in part, a designation of at least one probe point collected upstream of the at least one tunnel as at least one starting point of the at least one tunnel path, wherein a timestamp for the at least one probe point is a collection time of the at least one probe point. The apparatus is also caused, at least in part, a designation of at least one temporary probe point as at least one endpoint of the at least one tunnel path, wherein the at least one temporary probe point is downstream of the at least one tunnel and wherein a timestamp for the at least one temporary probe point is a current time. The apparatus is further caused to determine at least one temporary tunnel speed for the at least one tunnel path based, at least in part, on the timestamp for the at least one probe point and the current time associated with the at least one temporary probe point.

According to another embodiment, an apparatus comprises means for causing, at least in part, an aggregation of probe data associated with at least one vehicle into at least one tunnel path based, at least in part, on a network geometry topology for at least one tunnel. The apparatus also comprises means for causing, at least in part, a designation of at least one probe point collected upstream of the at least one tunnel as at least one starting point of the at least one tunnel path, wherein a timestamp for the at least one probe point is a collection time of the at least one probe point. The apparatus also comprises means for causing, at least in part, a designation of at least one temporary probe point as at least one endpoint of the at least one tunnel path, wherein the at least one temporary probe point is downstream of the at least one tunnel and wherein a timestamp for the at least one temporary probe point is a current time. The apparatus further comprises means for determining at least one temporary tunnel speed for the at least one tunnel path based, at least in part, on the timestamp for the at least one probe point and the current time associated with the at least one temporary probe point.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 3A, 3B, 4A and 4B are flowcharts of processes for determining tunnel speed for a vehicle travelling through a tunnel, according to various embodiments;

FIGS. 5A-5D are diagrams of procedures carried out for determining tunnel speed for a vehicle travelling through a tunnel, according to various embodiments;

DESCRIPTION OF SOME EMBODIMENTS

Figure 1:
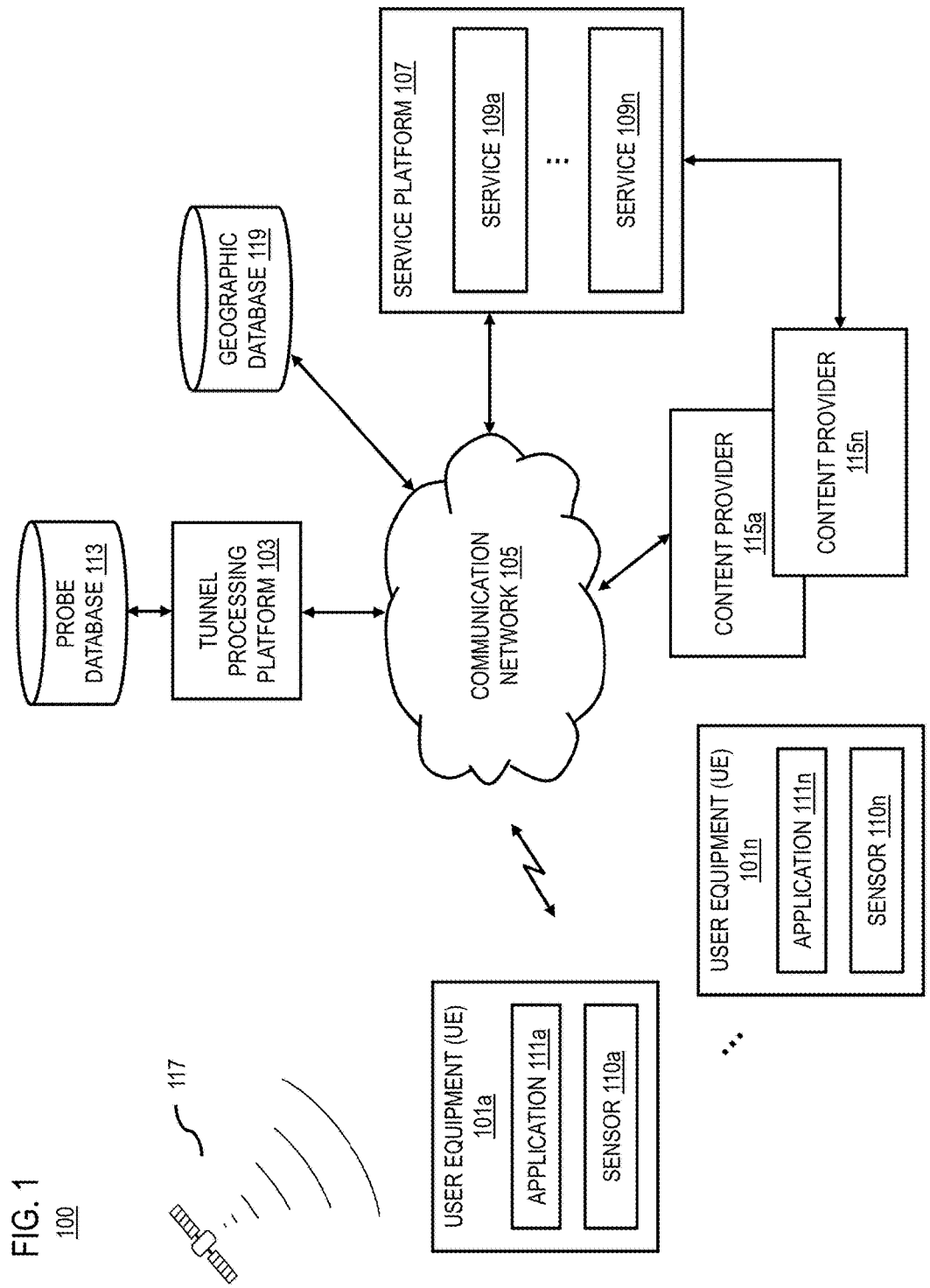
FIG. 1 is a diagram of a system for determining tunnel speed for a vehicle travelling through a tunnel, according to one embodiment.

Examples of a method, apparatus, and computer program for determining tunnel speed for a vehicle travelling through a tunnel are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

FIG. 1A is a diagram of a system for determining tunnel speed for a vehicle travelling through a tunnel, according to one embodiment. For the purpose of illustration herein, a tunnel may include any enclosure, structure or the like that encompasses a roadway through which vehicles or pedestrians drive. Typically, a roadway may be characterized as a network of links that extend about a geographic area. Each link includes at least a beginning node and a terminating node, where each node serves as a connection point to another link (e.g., an intersection, an entranceway), a terminating of the current link, etc. The network of links and/or nodes may be stored to a geographic information system/database (e.g., database 119) for use by various location based services. The road/link segments and nodes may also be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, bridges, tunnels, etc.

Location based services such as mapping and navigation services or traffic services may access the above described database to provide real-time navigation instructions or visual maps to requesting drivers. The ability of service providers to generate and convey such information is based upon the ability of the service to track the real-time location, position, direction/bearing, time, etc., of drivers as they travel in their vehicles. Typically, these services rely upon global positioning service (GPS) techniques for enabling such tracking, wherein a device such as an onboard navigator or mobile phone of the driver services as a probing mechanism. Under this scenario, the probe employs various sensors to collect the relevant tracking data and communicates this information as probe data to one or more GPS satellites available to the service providers. By way of example, GPS probe data may be persistently shared as one or more data packets or strings thereof for specifying the current latitude, longitude, altitude, heading, speed, precision, etc., of the vehicle.

Unfortunately, GPS satellite signals are lost when vehicles drive into tunnels, underground roadway systems or any other stretch of roadway featuring one or more physical obstructions (e.g., a canyon). Consequently, location based service providers that rely on GPS probe data for traffic processing are unable to accurately estimate vehicle speed and/or location within the tunnel. Current approaches to addressing this issue, such as dead-reckoning approximation, still require the vehicle to have emerged from the tunnel in order to perform any estimations of value. However, the tracking accuracy of the vehicle is limited given that the probe must first reacquire the satellite signal upon exiting the tunnel, further causing inaccurate map matching or location determination results.

Still further, the inability of service providers to receive and process real-time probe data when a vehicle enters a tunnel impedes the ability of providers to determine current traffic conditions and/or status within the tunnel. For example, without being able to approximate the vehicle speed, the provider cannot accurately determine a level of congestion of vehicles in the tunnel nor account for changing congestion conditions within the tunnel. In the case where congestion is encountered within the tunnel, significant amounts of time can elapse between a probe entering the tunnel and the same probe providing current data upon exiting the tunnel.

To address this issue, system 100 of FIG. 1 enables navigation systems and services, i.e., as used by a vehicle or in connection with user equipment (e.g., a mobile device), to estimate the speed of a vehicle driving through a tunnel. The estimation is calculated based on tunnel path data collected for one or more vehicles. By way of example, the tunnel path data may specify a path through a tunnel extending from at least one probe point associated with an upstream link of the tunnel to at least one related probe point associated with a downstream link of the tunnel. In addition, the system 100 enables the determining of a traffic status, a congestion level associated with the tunnel, or the like based, at least in part, on the estimated speed.

In one embodiment, a tunnel processing platform 103 of system 100 operates in connection with one or more user equipment (UE) 101a-101n, referred to herein collectively as UE 101. By way of example, the UE 101 may be an in-vehicle navigation system, a personal navigation device ("PND"), a portable navigation device, a cellular telephone, a mobile phone, a personal digital assistant ("PDA"), a watch, a camera, a computer and/or other device that can perform navigation or location based functions, i.e., digital routing and map display. It is contemplated, in future embodiments, that the cellular telephone may be interfaced with an on-board navigation system of an autonomous vehicle or physically connected to the vehicle for serving as the navigation system. Also, the UE 101 may be configured to access a communication network 105 by way of any known or still developing communication protocols. Per this communication network 105, the UE 101 may transmit probe data as well as access various network based services for facilitating.

Also, the UE 101 may be configured with navigation applications 111a-111n (also collectively referred to as applications 111) for interacting with one or more content providers 115a-115n, services 109a-109n of a service platform 107, or a combination thereof. Per these services, the navigation applications 111 of the UE 101 may acquire navigation information, location information, mapping information and other data associated with the current location of the vehicle, a direction or movement of the vehicle along a roadway, etc. Hence, the content providers 115 (collectively referred to as content providers 115) and services 109a-109n (collectively referred to as services 109) rely upon the gathering of probe data for executing the aforementioned services.

The UE 101 may be configured with various sensors 110a-110n (also collectively referred to as sensors 110) for acquiring and/or generating probe data regarding a vehicle, a driver, other vehicles, conditions regarding the driving environment or roadway, etc. For example, sensors 110 may be used as GPS receivers for interacting with one or more satellites 117 to determine and track the current speed, position and location of a vehicle travelling along a roadway. In addition, the sensors 110 may gather tilt data (e.g., a degree of incline or decline of the vehicle during travel), motion data, light data, sound data, image data, weather data, temporal data and other data associated with the vehicle and/or UEs 101 thereof. Still further, the sensors 110 may detect local or transient network and/or wireless signals, such as those transmitted by nearby devices during navigation of a vehicle along a roadway. This may include, for example, network routers configured within a premise (e.g., home or business), another UE 101 or vehicle or a communicable traffic system (e.g., traffic lights, traffic cameras, traffic signals, digital signage). It is noted that the above described data may be transmitted to the satellites 117 as GPS data according to any known wireless communication protocols.

In one embodiment, the tunnel processing platform 103 aggregates probe data gathered and/or generated by UE 101 resulting from the driving of multiple different vehicles through a given tunnel. The probe data may be aggregated by the tunnel processing platform 103 to generate a probe-path and corresponding tunnel path data in association with a tunnel encountered by/driven through by respective vehicles. By way of example, a probe-path may be depicted as a path extending from a first probe point and a second probe point associated with an upstream or downstream link of a tunnel. Under this scenario, a tunnel may feature at probe path corresponding to each entrance and exit of a tunnel. For example, in the case of a tunnel featuring a single entrance and exit, a first probe-path of the tunnel may be defined as a path extending from a first probe point (e.g., as captured during a segment of the upstream link) to a second probe point (e.g., as captured during a segment of the upstream link closer to the entrance of the tunnel). The second probe path would be defined as a path extending from a third probe point (e.g., as captured at a point along the segment of the downstream link following the exit) to a fourth probe point (e.g., as captured further downstream from the exit).

Also, a tunnel path can be calculated as a path through the tunnel extending from at least one probe point (e.g., a location/time) associated with an upstream link of a tunnel to at least one related probe point associated with the downstream link of the tunnel. The tunnel path may extend from the probe point nearest the entrance to the exit(s) of a tunnel, thus approximating a distance/length/path to traverse the tunnel. Alternatively, a super path may be defined to extend from a probe point further upstream from the entrance to the tunnel to a probe point further downstream from the exit, thus representing a distance/length/path to traverse the tunnel and at least a portion of the upstream and downstream links.

It is noted, per the above described scenarios, that each of the probe points where probe data is captured is associated with the same probe identifier/UE 101 identifier. As such, any probe data captured in connection with the same probe identifier is associated with the same segment of roadway/link, tunnel, geographic location, time interval, vehicle/driver, etc.

In one embodiment, the tunnel processing platform 103 also generates a network geometry topology based on the aggregated tunnel path data. For the purpose of illustration herein, the network geometry topology defines the arrangement of and/or relationship between the various links and/or nodes surrounding the tunnel for which the probe data was gathered. As such, the network geometry topology may be depicted physically or logically and maintained as a dataset in association with a unique identifier of the tunnel via a probe database 113. The tunnel identifier may be established by providers of the content, the service platform 107 or the geographic information system database 119 for enabling subsequent cross referencing, matching and validation of the probe data.

In one embodiment, the tunnel processing platform 103 validates the aggregated probe point data and tunnel paths by performing a map matching procedure. By way of example, the map matching may include comparing the upstream and downstream location data for respective probes associated with the same identifier against known mapping information to determine a match. If the upstream probe-path and downstream probe-paths are determined valid, their corresponding probe points are validated as being correctly map-matched. The matching process also ensures more accurate identification of a tunnel or roadway link upon which a vehicle is driving and reduces the likelihood of improper identification of probes relative to a given probe point. It is noted that the network geometry topology data may be cross referenced for validation and identification purposes to eliminate/disambiguate irrelevant roadway links that are not part of the defined network geometry topology.

In one embodiment, the tunnel processing platform 103 calculates an estimated speed of a vehicle as it travels through a tunnel. The estimate is determined based, at least in part, on identification of the tunnel upon which the vehicle is driving as well as the determined probe path for a given tunnel. By way of example, the tunnel processing platform 103 utilizes the timestamp information and location information as collected at respective probe points along the upstream and downstream links. The tunnel processing platform 103 then utilizes this data to estimate the average speed through the tunnel paths as follows:

$$\text{Average Speed} = \text{Tunnel-Path Length}(\text{Location 2} - \text{Location 1}) \div \text{Time Difference}$$

The time difference may be determined based on the timestamps determined at respective probe points.

It is noted the above described approach may be employed by the tunnel processing platform 103 in cases where the flow of traffic through a tunnel is mild or there is slight congestion (slowly moving traffic). In this case, the calculation is able to be performed due to the availability of upstream and downstream probe data. However, in the case where there is heavy congestion (very limited speed) in the tunnel, the tunnel processing platform 103 may not have access to the downstream probe data.

In one embodiment, the tunnel processing platform 103 designates a probe point along a location downstream link of the tunnel in response to entry of the vehicle onto an upstream link of a tunnel. Per this scenario, the designated probe point serves as a temporary probe point (location/time) for determining an estimated speed of the vehicle as it travels through the tunnel. By way of example, the tunnel processing platform 103 records the timestamp corresponding to entry of the vehicle onto an upstream link of the tunnel and assigns the designated probe point to the local current time. Hence, the timestamp for the designated or temporary probe point is non-static while the timestamp recorded for the probe at the upstream links is static. Resultantly, the timestamp associated with the temporary probe point at the downstream link increases the longer the vehicle remains within the tunnel, thus increasing the time window.

In one embodiment, the tunnel processing platform 103 determines a temporary probe-path across the tunnel based on the initial (upstream link) probe data and the temporary probe data as follows:

$$\text{Estimated Speed} = \text{Temporary Tunnel-Path Length}(\text{Temp Location 2} - \text{Location 1}) \div (\text{Current Time} - \text{Time 1}),$$

The value for Temp Location 2 corresponds to the location of the designated downstream probe point and the current time corresponds to the increasing current time.

It is noted that the above calculation may be performed based on the processing of probe data in association with a common vehicle identifier and/or UE 101 identifier. As such, the tunnel processing platform 103 is able to determine when the vehicle corresponding to an initial set of probe data and temporary probe data enters and subsequently exits the tunnel. Per this approach, as soon as a probe that is associated with a unique vehicle and/or UE 101 identifier traverses the upstream link, the corresponding temporary probe point is created for this vehicle and the estimated tunnel speed is calculated immediately. Once the vehicle traverses the tunnel, however and GPS probe data is capable of transmission, the estimated tunnel speed is replaced with the actual speed.

In one embodiment, the tunnel processing platform 103 determines an estimated traffic congestion status of the tunnel based on the estimated (temporary) tunnel speed. Under this scenario, the tunnel processing platform 103 analyzes the estimated speed to whether it meets one or more predetermined speed thresholds or if certain conditions are met. By way of example, in the case where a vehicle has a delayed exit from a tunnel, the value of the calculated temporary speed would continue to drop as the time window within the tunnel increases. Resultantly, when the estimated speed is determined to reach a value of X, the tunnel processing platform 103 may be configured to execute an action such as publish and/or generate a message for indicating the congestion status. Alternatively, when the estimated speed is determined to drop further to a value Y, the tunnel processing platform 103 may determine the usefulness of such a speed calculation is diminished and stop any further presentment of the value.

As another example, when the estimated (temporary) speed is determined to reach a value Z, the tunnel processing platform 103 may associate this speed with a mild and/or heavy traffic condition. Resultantly, the tunnel processing platform 103 may publish and/or generate a message for indicating the mild and/or heavy congestion. It is noted that the published and/or generated estimated traffic congestion status may be rendered directly the UE 101 via the navigation application 111. Alternatively, the estimated traffic congestion status may be directly shared with the content provider 115, the services 109 of the service platform 107, or a combination thereof.

By way of example, the tunnel processing platform 103 may be implemented as a cloud based service, hosted solution or the like for performing the above described functions. Alternatively, the tunnel processing platform 103 may be directly integrated for processing data generated and/or provided by one or more services 109a-109n, content providers 115a-115n or applications 111a-111n. Per this integration, the tunnel processing platform 103 may translate location based information, navigation related content or the like into useful speed calculations for use when vehicles travel into tunnels.

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the UEs 101, tunnel processing platform 103, the service platform 107, and the content providers 115 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
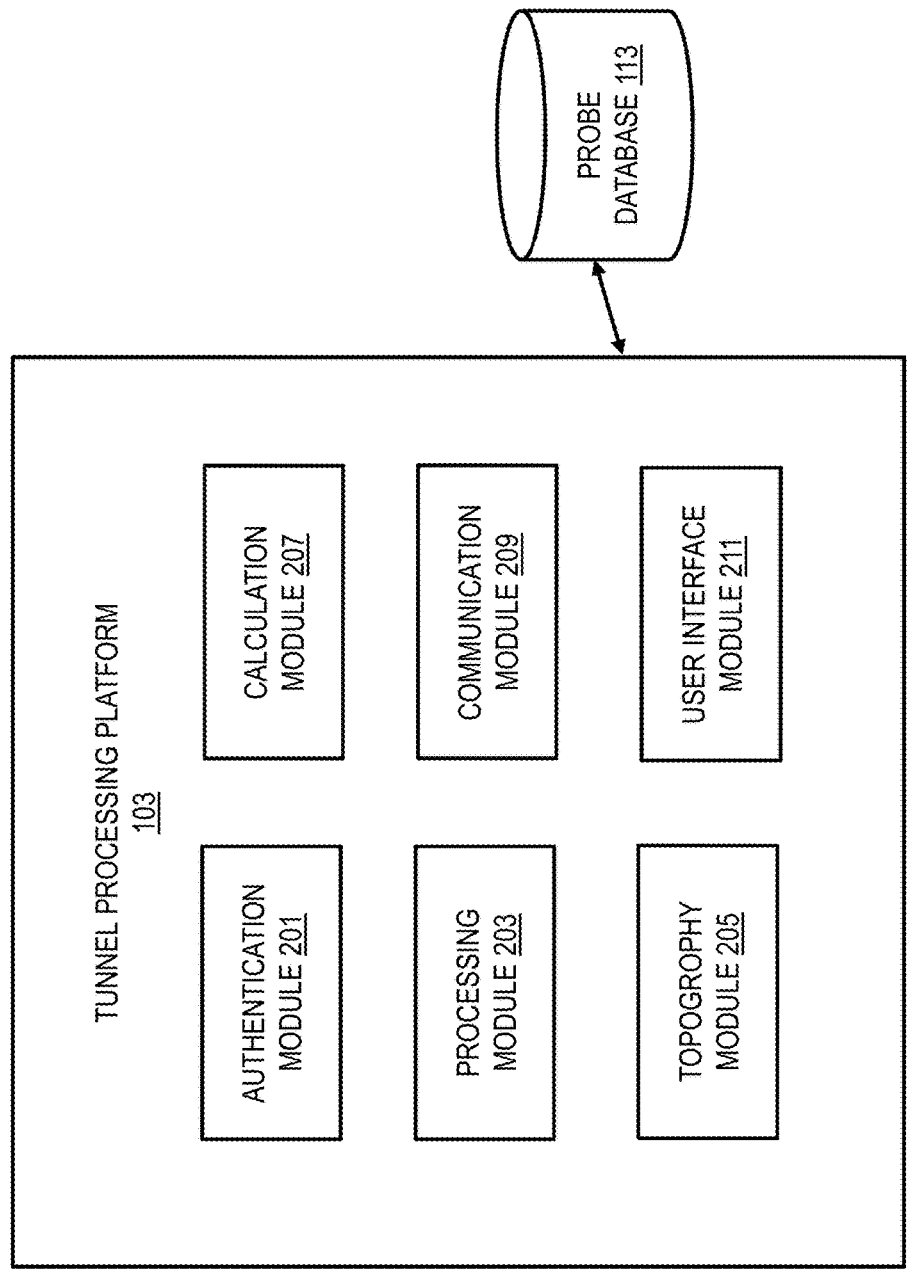
FIG. 2 is a diagram of the components of a tunnel processing platform, according to one embodiment.
Figure 3B:
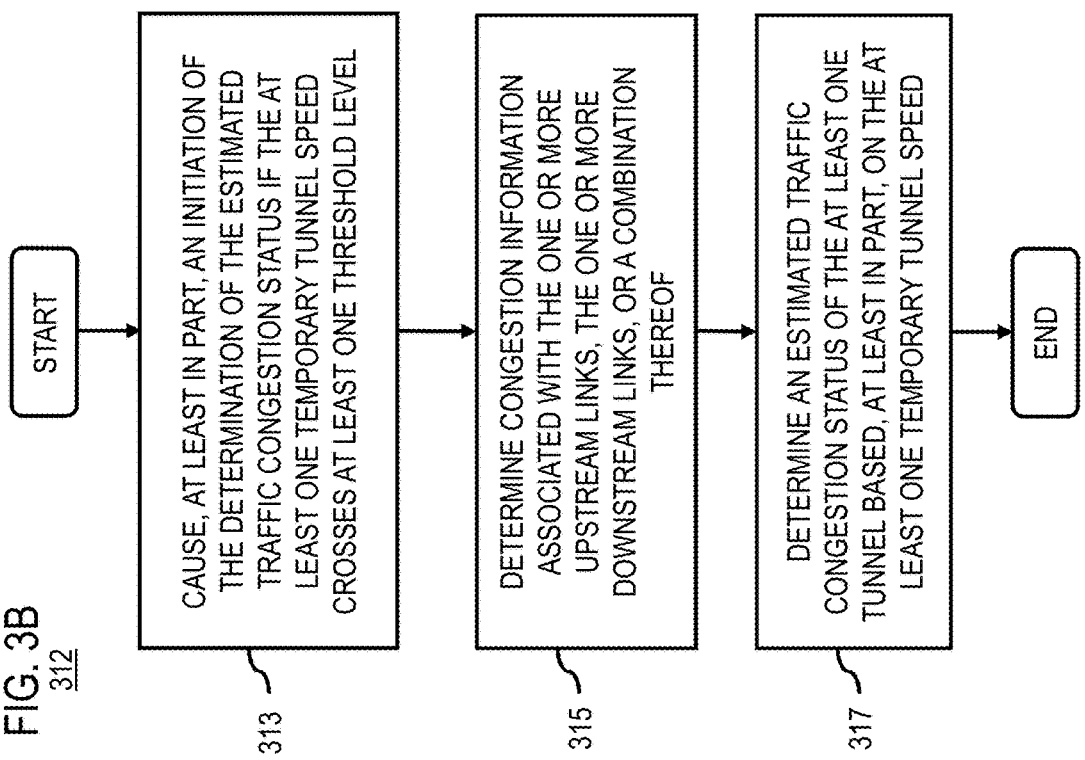

FIG. 2 is a diagram of the components of a tunnel processing platform, according to one embodiment. By way of example, the tunnel processing platform 103 includes one or more components for determining tunnel speed for a vehicle travelling through a tunnel. It is contemplated that the functions of these components may be combined or performed by other components of equivalent functionality. In this embodiment, the tunnel processing platform 103 includes an authentication module 201, a processing module 203, a topography module 205, a calculation module 207, a communication module 209 and a user interface module 211.

The authentication module 201 authenticates users and UE 101 for interaction with the tunnel processing platform 103. By way of example, the authentication module 201 receives a request to access the tunnel processing platform 103 via an application 111. The request may be submitted to the authentication module 201 via the communication module 209, which enables an interface between the navigation application 111 and the platform 103. In addition, the authentication module 201 may receive a first-time subscription request from a UE 101, a request to create a user profile, a permission message validating consent by a UE 101 to share contextual information with the platform 103, or a combination thereof. It is noted that the authentication module 201 may further be configured to support and/or validate the formation of profile by a provider of a service 109 or content provider 115, i.e., for supporting integration of the tunnel speed determination capabilities with said providers or services.

The processing module 203 operates in connection with the topography module 205 to collect and analyze probe data as generated by one or more authenticated UE 101. The processing module 203 aggregates the probe data generated by the sensors of the UE 101 for specifying the GPS probe data along with other sensor readings such as acceleration, road curvature, vehicle tilt, driving mode, brake pressure, etc. It then stores this as probe data to database 113 in association with a unique identifier of the vehicle, driver of UE 101 that transmitted the probe data. The processing module also generates a probe path based on the collection of probe data corresponding to points along the upstream and downstream links of a tunnel.

The processing module 203 compares the probe data (e.g., location, direction) and probe-paths as generated against existing network geometry topology data to determine if they match a known tunnel in which the vehicle is traversing. In addition, the topography module 205 performs map matching for validating the aggregated probe data. It is noted that the topography module 205 may also operate upon the probe data as aggregated by the processing module 203 to generate and/or update network geometry topology data regarding a tunnel. As such, the network geometry topology may be generated to specify the upstream links (and corresponding probe paths) to the tunnel and the downstream links (and corresponding probe paths) to the tunnels.

The calculation module 207 processes the upstream and downstream probe-paths into tunnel-paths. The tunnel paths may be generated using two upstream and downstream probes points with the same probe-IDs, wherein the distance between the two probe points defines the length/extent of the path through the tunnel. It is noted that use of calculated probe-paths instead of individual probe-points mitigates errors and increases the likelihood of identification of a tunnel upon which a vehicle is currently driving. This also increases the effectiveness of map matching, as the mapping service would have automatically eliminated any wrongly map-matched probe-points that do not correspond to the network geometry topology data.

In addition, the calculation module 207 determines an estimated temporary speed to associate with a vehicle/UE 101 once it is determined to have entered onto the upstream link or into the tunnel. By way of example, the calculation module 207 designates a temporary probe point to the vehicle/UE 101 corresponding to a location along the downstream link. The calculation module also assigns this temporary probe point with a "running" timestamp, wherein the timestamp is equal to the current local time. Once established, the calculation module 207 then determines a temporary tunnel path for the vehicle/UE 101 accordingly and calculates an estimated speed of the vehicle.

As the time in which the vehicle stays within the tunnel increases, the estimated tunnel speed is persistently updated accordingly. Once the speed reaches a predetermined threshold, the calculation module 207 triggers execution of the communication module 209 and/or user interface module 211 to facilitate the publishing and/or presentment of a congestion status of the vehicle. For example, a determined speed of less than 15 miles per hour may correspond to a heavy congestion status relative to a maximum allowed tunnel speed of 50 miles per hour. As another example, a speed of 30 miles per hour may correspond to a congestion status of light to moderate. It is noted that the calculation module 207 may further access a geographic database for determining relative speed limits along a link, known curvature characteristics, or other information that may impact the relevancy, accuracy, effectiveness or context of a determined estimated (temporary) speed calculation.

The calculation module 207 also adapts the estimated speed to the actual speed upon determining emergence of the vehicle/UE 101 from a tunnel. This is based on the processing of probe data by the processing module 203 for indicating that the vehicle has traversed through the tunnel. Once adapted, the calculation module 107 further triggers execution of the communication module 209 and/or user interface module 211 to publish and/or present the updated speed value.

It is further noted that the user interface module 211 may operate in connection with the communication module 209 to facilitate the exchange of tunnel speed information and vehicle status information via the communication network 105 with respect to the services 109, content providers 115 and applications 111. Alternatively, the communication module 209 may facilitate transmission of the calculated speed and congestion status information directly to the services 109 or content providers 115.

The above presented modules and components of the tunnel processing platform 103 can be implemented in hardware, firmware, software, or a combination thereof. Though depicted as a separate entity in FIG. 1, it is contemplated that the platform 103 may be implemented for direct operation by respective UEs 101. As such, the tunnel processing platform 103 may generate direct signal inputs by way of the operating system of the UE 101 for interacting with the application 111. In another embodiment, one or more of the modules 201-211 may be implemented for operation by respective UEs as a platform 103, cloud based service, or combination thereof.

Figure 7:
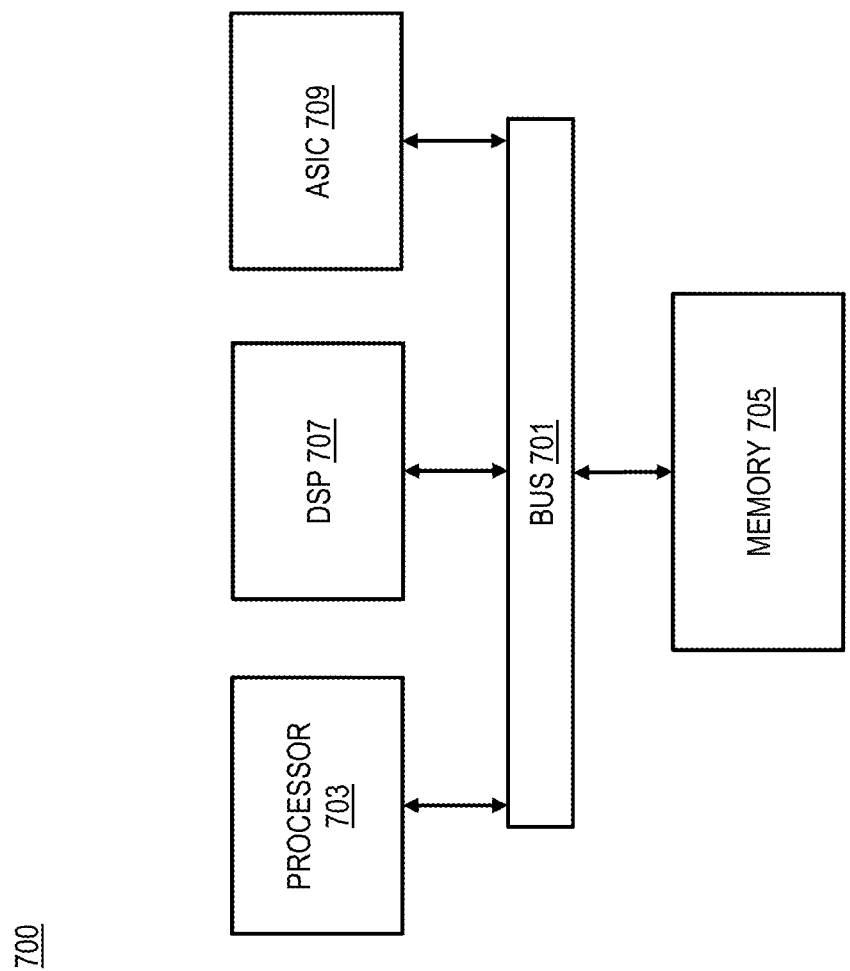
FIG. 7 is a diagram of a chip set that can be used to implement an embodiment of the invention.

FIGS. 3A, 3B, 4A and 4B are flowcharts of processes for determining a position of a vehicle relative to a travel path based on driving behavior, according to various embodiments. In one embodiment, the tunnel processing platform 103 performs processes 300, 312, 400 and 404 and is implemented in, for instance, a chip set including a processor and a memory as shown in FIG. 7.

In step 301 of process 300, the tunnel processing platform 103 causes, at least in part, an aggregation of probe data associated with at least one vehicle into at least one tunnel path based, at least in part, on a network geometry topology for at least one tunnel. As mentioned previously, the network geometry topology defines the arrangement of and/or relationship between the various links and/or nodes surrounding the tunnel for which the probe data was gathered. It is noted that the network geometry topology may be maintained directly by the platform 103 or in connection with a provider of a geographic database, a content provider, a service, etc.

In step 303, the tunnel processing platform 103 causes, at least in part, a designation of at least one probe point collected upstream of the at least one tunnel as at least one starting point of the at least one tunnel path, wherein a timestamp for the at least one probe point is a collection time of the at least one probe point. In another step 305, the platform 103 causes, at least in part, a designation of at least one temporary probe point as at least one endpoint of the at least one tunnel path, wherein the at least one temporary probe point is downstream of the at least one tunnel and wherein a timestamp for the at least one temporary probe point is a current time. As noted previously, the temporary probe point may be used for determining at least one temporary tunnel speed for the at least one tunnel path based, at least in part, on the timestamp for the at least one probe point and the current time associated with the at least one temporary probe point, corresponding to step 307.

In step 309, the tunnel processing platform 103 determines that at least one actual probe point associated with the at least one vehicle has been collected downstream of the at least one tunnel. This corresponds to an emergence/exit of the vehicle from the tunnel, wherein the probe data is again available for detection. In another step 311, the platform 103 determines at least one real tunnel speed in place of the at least one temporary tunnel speed based, at least in part, on the at least one actual probe point. As noted previously, the real tunnel speed is published or conveyed instead of the estimated tunnel speed due to the exit of the vehicle from the tunnel.

In step 313 of process 312 (FIG. 3B), the tunnel processing platform 103 causes, at least in part, an initiation of the determination of the estimated traffic congestion status if the at least one temporary tunnel speed crosses at least one threshold level. The congestion status may characterize the congestion in the tunnel as "light" or "heavy." In another step 315, the platform 103 determines congestion information associated with the one or more upstream links, the one or more downstream links, or a combination thereof. The congestion information may include data for specifying an obstruction, a traffic condition, or other impediment to the vehicle. In yet another step 317, the platform 103 determines an estimated traffic congestion status of the at least one tunnel based, at least in part, on the at least one temporary tunnel speed In step 401 of step 400 (FIG. 4A), the tunnel processing platform 103 causes, at least in part, a validation of the aggregation of the probe data into the at least one tunnel path by map-matching the probe data to the network geometry topology, the one or more upstream links, the one or more downstream links, the at least one tunnel, or a combination thereof. In step 403, the platform 103 causes, at least in part, a flagging of the one or more upstream links, the one or more downstream links, or a combination thereof in at least one mapping database to associate the one or more upstream links, the one or more downstream links, or a combination thereof with the at least one tunnel.

In step 405 of process 404 (FIG. 4B), the tunnel processing platform 103 determines one or more upstream links, one or more downstream links, or a combination thereof associated with the at least one tunnel, wherein the one or more upstream links represents one or more upstream travel segments that is traveled to enter the at least one tunnel and wherein the one or more downstream links represents one or more downstream travel segments that is traveled when exiting the at least one tunnel. As noted previously, this determination corresponds to an identification of the tunnel by the platform 103. In another step 407, the platform 103 causes, at least in part, a creation of the network geometry topology for the at least one tunnel based, at least in part, on the one or more upstream links, the one or more downstream links, or a combination thereof.

FIGS. 5A-5D are diagrams of procedures carried out for determining tunnel speed for a vehicle travelling through a tunnel, according to various embodiments. For the purpose of illustration herein, the diagrams are described with respect to a vehicle having an on-board navigation system that is configured to interact with the tunnel processing platform 103.

Figure 5A:
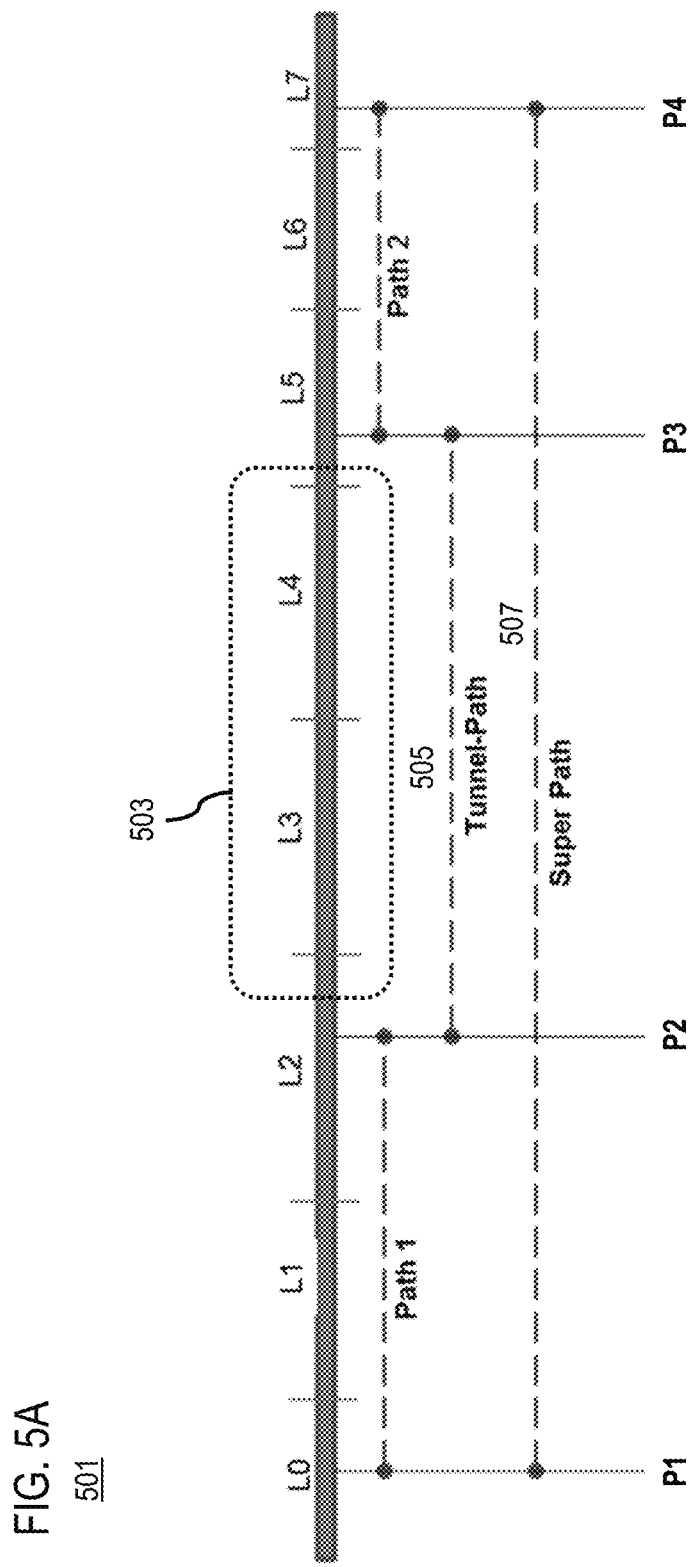

In FIG. 5A, the tunnel processing platform 103 determines a tunnel path of a tunnel 503 in which the vehicle is approaching. Under this scenario, the roadway comprises multiple links, labelled herein as roadway links L0-L7 and links L3 and L4 are encompassed by the tunnel. As the vehicle drives along the upstream segments of the roadway, probe data is collected at a first probe point (P1) and then again at a second probe point (P2), corresponding to links L0 and L2 respectively. The probe data includes at least location information and time information corresponding to the respective points P1 and P2 and is associated with a common probe identifier, vehicle identifier, or the like. This defines a first probe path labeled Path 1, corresponding to an upstream link of the tunnel 503.

Similarly, when the vehicle traverses the tunnel, a second probe path labeled Path 2 is defined based on the collection of probe data at a third probe point (P3) and fourth probe point (P4). This probe path extends from link L5 to L7 of the roadway and corresponds to a downstream link of the tunnel 503. Path 2 is also associated with the same probe identifier, vehicle identifier, or the like. As such, the tunnel processing platform 103 may identify a tunnel path 505 of the tunnel 503 as a distance/path traversed through the tunnel extending from P2 to P3. Another tunnel path (a super path 507) may also be identified as a distance/path traversed through the tunnel extending from P1 to P4.

Hence, the tunnel paths are derived from two (valid) probe-paths of the tunnel 503. The probe path data is aggregated by the tunnel processing platform 103 into the tunnel path 505 and/or 507 based on a network geometry topology for the roadway/tunnel 503. Also, the aggregated probe paths are validated—determined to be a proper match to the tunnel—based on map matching of the probe data defining the probe-paths. By way of this approach, the tunnel processing platform 103 ensures that probe point location data that does not match the mapping information is disregarded as such data would not result in a valid tunnel path as defined per the network geometry topology.

It is noted that the aggregation procedure as described is performed by the tunnel processing platform 103 based on the gathering of probe data for several vehicles that traverse the same tunnel 503 within a time epoch t. This results in persistent updating and/or generating of the network geometry topology regarding the tunnel. In addition, the tunnel processing platform 103 may generate an average tunnel speed based on the timestamp and location information aggregated over time. It is contemplated in future embodiments, that the average tunnel speed as calculated based on probe data at points P1-P4 (but not at points within the tunnel), may be utilized as a benchmark speed value. For example, if an average speed through the tunnel is determined to be 45 miles per hour, this may be designated as a benchmark speed value for establishing one or more congestion thresholds for evaluating an effectiveness of an estimated speed of a vehicle within the tunnel.

Figure 5B:
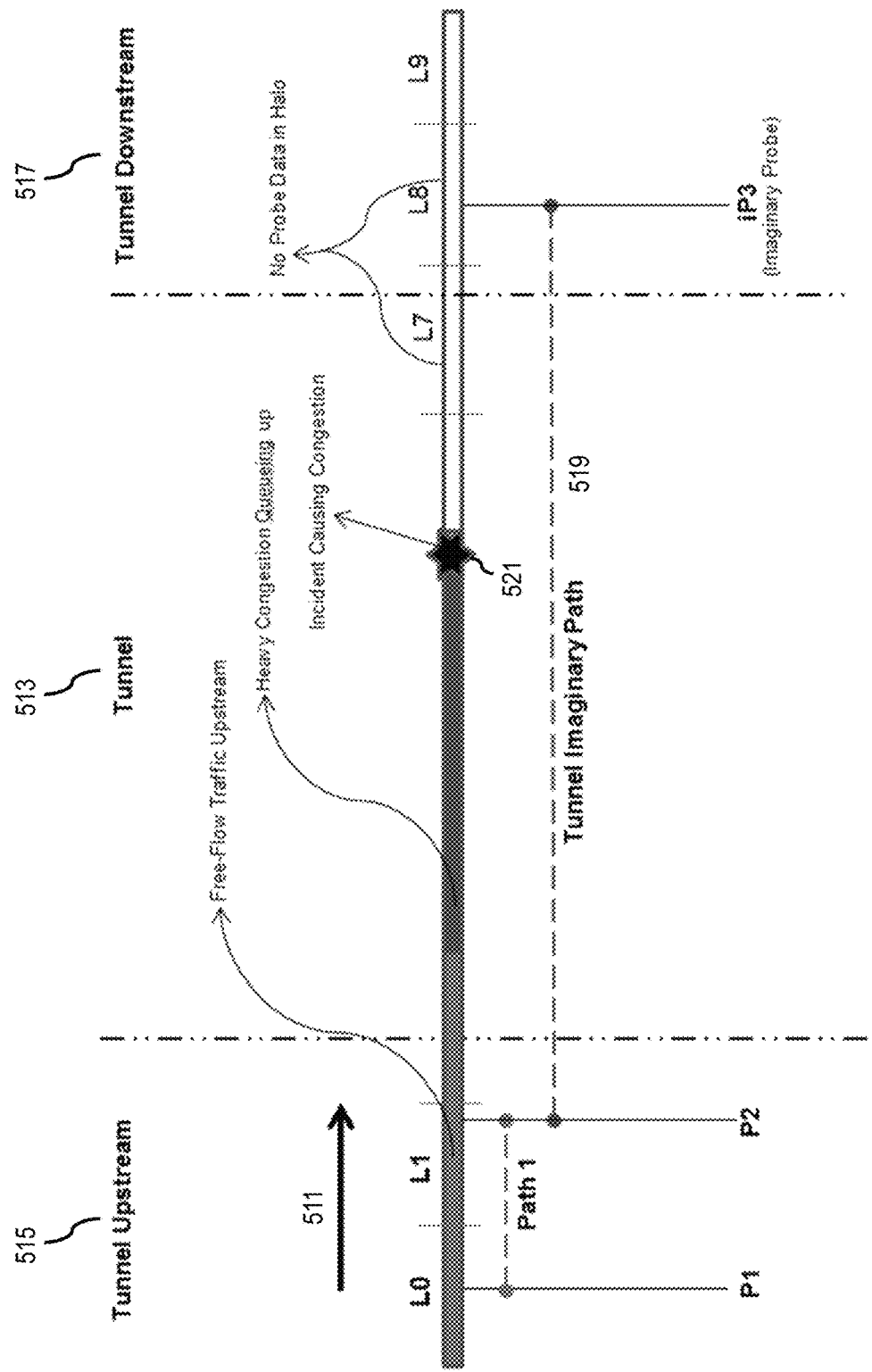
Figure 5C:
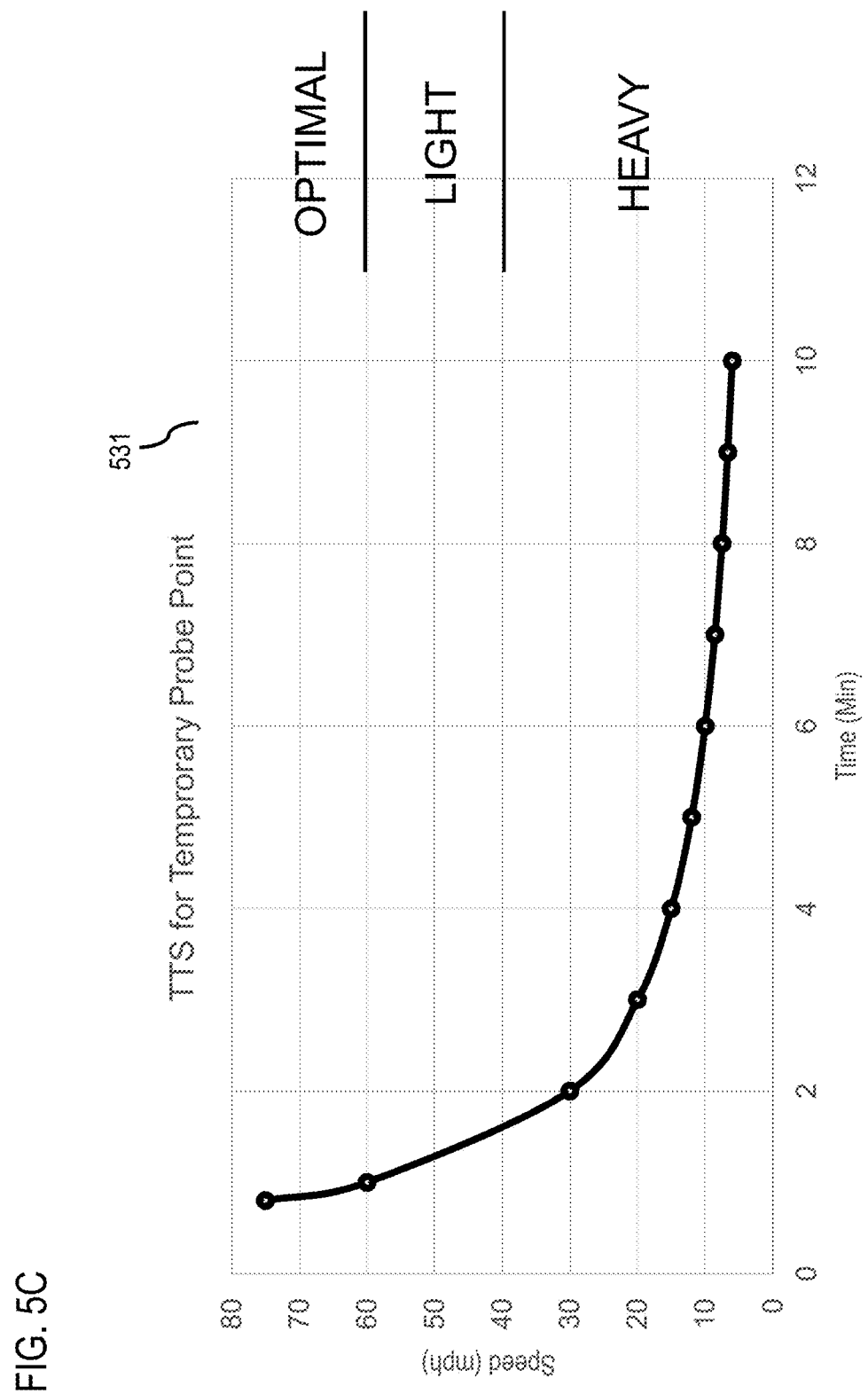

In FIG. 5B, a scenario is depicted for a vehicle travelling onto and through a tunnel that is heavily congested. By way of example, a vehicle traveling in a direction 511 along a roadway comprised of roadway links L0-L9 approaches a tunnel 513. The congestion status along the upstream link 515 of the tunnel 513 is favorable (no congestion) as the vehicle proceeds along the roadway and into the tunnel 513. During the drive along the upstream link 515 of the tunnel, probe data is captured at probe points P1 and P2 in connection with the vehicle (e.g., a vehicle identifier) and an upstream probe-path (labeled Path 1) is determined. Also, at the time of capture of the probe data at points P1 and P2, an imaginary (temporary) probe point labeled iP3 is designated by the tunnel processing platform 103 as an endpoint of the tunnel.

Under this scenario, the temporary probe point is designated at a location along a downstream link 517 of the tunnel, corresponding to roadway link L8. In addition, a timestamp is designated in association with the temporary probe point iP3 as the current local time. Hence, the temporary probe point (iP3) corresponds to specific location coordinates and ever-changing timestamp information, and is used by the tunnel processing platform 103 to determine an imaginary (temporary) tunnel path 519. In this case, the temporary tunnel path 519 extends through the tunnel from probe point P2 to the temporary probe point (iP3). Also, a temporary tunnel speed is determined based on the tunnel path determination—i.e., as a ratio of the difference between the location and timestamp information between respective probe points P2 and iP3.

As the vehicle enters the tunnel 513, the congestion level increases due to an obstruction 521 along the roadway. Consequently, the temporary (estimated) tunnel speed decreases as the amount of time the vehicle remains in the tunnel 513 increases. This is depicted, by way of example, in FIG. 3 and illustrated for example purposes below with respect to Table 1. It is assumed in this example that the length of the tunnel path 519—calculated based on the distance differential between probe points P2 and iP3—is one mile.

TABLE 1

| Current Time (min) | 0.8 | 1 | 2 | 3 | 4 | 5 | 6 | 7 | 8 | 9 | 10 |
|---|---|---|---|---|---|---|---|---|---|---|---|
| Temporary Tunnel Speed (mile/hr) | 75 | 60 | 30 | 20 | 15 | 12 | 10 | 8.5 | 7.5 | 6.6 | 6 |

At a time of 0.8 minutes, corresponding to a moment of initial entry of the vehicle into the tunnel 513, the temporary (estimated) tunnel speed is determined to be 75 miles per hour. As the vehicle traverses the tunnel however, the estimated tunnel speed is continually updated, thus reflecting a decrease in speed. For example, after 3 minutes, the estimated tunnel speed is 20 miles per hour for the vehicle and is further determined to be 6.6 miles per after 9 minutes. This corresponds to the line graph 531 shown in FIG. 5C, which depicts a significant decrease in the estimated speed of the vehicle between time t=0.8 minutes and t=2 minutes corresponding to the approaching of the vehicle to the obstruction, the disruption in traffic flow, etc. The estimated speed continues to decrease, albeit more gradually, as time elapses, thus depicting a continued limited traffic flow through the tunnel.

The tunnel processing platform 103 determines a traffic congestion status of the vehicle within the tunnel based on the estimated tunnel speed. For example, an optimal traffic flow may be predetermined to correspond to any speed at or above the known speed limit. Hence, if the speed limit is 60 miles per hour, the congestion status for the vehicle at t=0.8 and t=1.0 minutes is determined to be non-congested/optimal, as depicted by the OPTIMAL label shown for these speeds in FIG. 5C. As another example, when the speed is determined to be within a range less than the speed maximum and above the speed minimum for the tunnel/roadway, this may correspond to light congestion status as depicted by the LIGHT label shown for these speeds in FIG. 5C. As yet another example, any speeds below the minimum speed limit for the tunnel may be classified as heavy congestion, as depicted by the HEAVY label shown for these speeds in FIG. 5C. Under this scenario, a heavy congestion status is determined from time t=2 minutes and beyond.

It is noted that various other means of determining the congestion status may be employed beyond the range based example presented above. For example, the threshold values or ranges may be specified by the provider of the services 109 or different content providers 115 at according to their own preferences. Furthermore, various conditional approaches may be employed for determining the congestion status, such as evaluating the rate of speed change or comparing of the estimated speed to a benchmark/normal speed through the tunnel. Regardless of the approach employed, the tunnel processing platform 103 may interact with a requesting navigation device and/or service 109 or content provider 115 to render the congestion status and estimated speed information to the driver. For example, in FIG. 5D, a display 533 for showing a user interface of a navigation device 540 of the vehicle is depicted.

In this example, the user interface presents a visual depiction (map rendering 535) of the tunnel along with a label 536 and descriptor 539 for indicating heavy traffic within the tunnel. The user interface also presents the estimated speed of vehicle at the current time, which in this case corresponds to a speed of 30 miles per hour after an elapsed time of 2 minutes per Table 1. As the vehicle remains in the tunnel, the estimated speed value 537, label 536, descriptor 539 and map rendering 535 are updated accordingly. By way of this approach, the driver is presented with relevant information regarding their current driving conditions despite the fact that no GPS probe data can be transmitted to the satellites 117 and/or services 109 or content providers 115. It is noted that the tunnel processing platform 103 may store the estimated speed data as aggregated for different vehicles to as historical data, i.e., to perform predictive modeling of traffic conditions, to determine tunnel traffic patterns, etc.

In keeping with the example presented with respect to FIG. 5B, FIG. 5B and Table 1, an actual probe point is finally detected when the vehicle enters onto the downstream link 517 of the tunnel at 10 minutes. This results in the calculation of a real-time tunnel speed of 6 miles per hour. Under this scenario, the real-time tunnel speed is able to be determined due to the availability of satellite signal communication with the vehicle probe. Once determined, the estimated tunnel speed is no longer presented to the display 533 of FIG. 5D and the actual vehicle speed of 6 miles per hour is presented as the value 537. It is noted that the emergence of the vehicle from the tunnel is able to be determined based on a match between the probe identifier and/or vehicle identifiers captured at the respective upstream and downstream probe points of the tunnel.

The processes described herein for determining tunnel speed for a vehicle travelling through a tunnel may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 6:
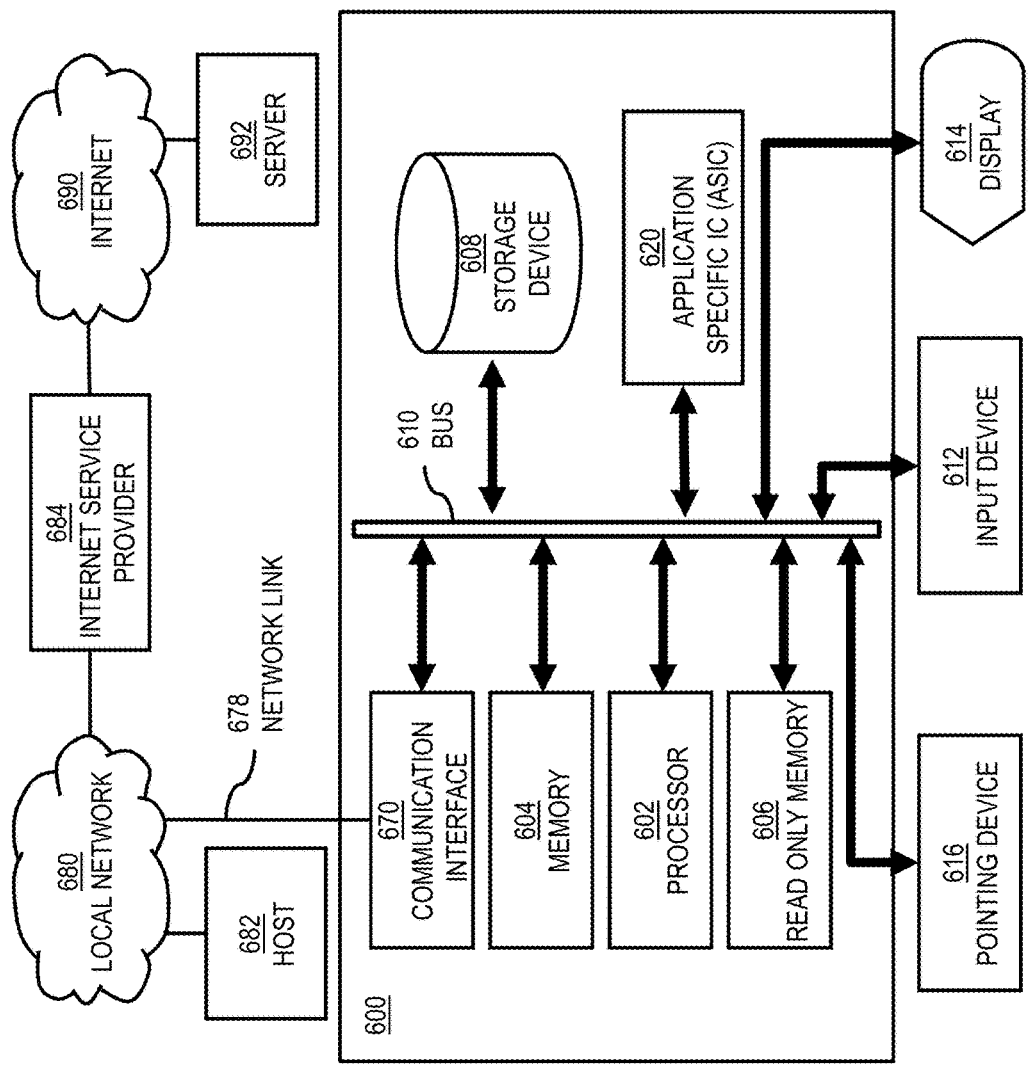
FIG. 6 is a diagram of hardware that can be used to implement an embodiment of the invention.

FIG. 6 illustrates a computer system 600 upon which an embodiment of the invention may be implemented. Although computer system 600 is depicted with respect to a particular device or equipment, it is contemplated that other devices or equipment (e.g., network elements, servers, etc.) within FIG. 6 can deploy the illustrated hardware and components of system 600. Computer system 600 is programmed (e.g., via computer program code or instructions) to determine tunnel speed for a vehicle travelling through a tunnel as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 600, or a portion thereof, constitutes a means for performing one or more steps of determining tunnel speed for a vehicle travelling through a tunnel.

A bus 610 includes one or more parallel conductors of information so that information is transferred quickly among devices coupled to the bus 610. One or more processors 602 for processing information are coupled with the bus 610.

A processor (or multiple processors) 602 performs a set of operations on information as specified by computer program code related to determine tunnel speed for a vehicle travelling through a tunnel. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random access memory (RAM) or any other dynamic storage device, stores information including processor instructions for determining tunnel speed for a vehicle travelling through a tunnel. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or any other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for determining tunnel speed for a vehicle travelling through a tunnel, is provided to the bus 610 for use by the processor from an external input device 612, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT), a liquid crystal display (LCD), a light emitting diode (LED) display, an organic LED (OLED) display, a plasma screen, or a printer for presenting text or images, and a pointing device 616, such as a mouse, a trackball, cursor direction keys, or a motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of ASICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals, that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to the communication network 105 for determining tunnel speed for a vehicle travelling through a tunnel to the UE 101.

The term "computer-readable medium" as used herein refers to any medium that participates in providing information to processor 602, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 608. Volatile media include, for example, dynamic memory 604. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 620.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690.

A computer called a server host 692 connected to the Internet hosts a process that provides a service in response to information received over the Internet. For example, server host 692 hosts a process that provides information representing video data for presentation at display 614. It is contemplated that the components of system 600 can be deployed in various configurations within other computer systems, e.g., host 682 and server 692.

At least some embodiments of the invention are related to the use of computer system 600 for implementing some or all of the techniques described herein. According to one embodiment of the invention, those techniques are performed by computer system 600 in response to processor 602 executing one or more sequences of one or more processor instructions contained in memory 604. Such instructions, also called computer instructions, software and program code, may be read into memory 604 from another computer-readable medium such as storage device 608 or network link 678. Execution of the sequences of instructions contained in memory 604 causes processor 602 to perform one or more of the method steps described herein. In alternative embodiments, hardware, such as ASIC 620, may be used in place of or in combination with software to implement the invention. Thus, embodiments of the invention are not limited to any specific combination of hardware and software, unless otherwise explicitly stated herein.

The signals transmitted over network link 678 and other networks through communications interface 670, carry information to and from computer system 600. Computer system 600 can send and receive information, including program code, through the networks 680, 690 among others, through network link 678 and communications interface 670. In an example using the Internet 690, a server host 692 transmits program code for a particular application, requested by a message sent from computer 600, through Internet 690, ISP equipment 684, local network 680 and communications interface 670. The received code may be executed by processor 602 as it is received, or may be stored in memory 604 or in storage device 608 or any other non-volatile storage for later execution, or both. In this manner, computer system 600 may obtain application program code in the form of signals on a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red carrier wave serving as the network link 678. An infrared detector serving as communications interface 670 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602.

FIG. 7 illustrates a chip set or chip 700 upon which an embodiment of the invention may be implemented. Chip set 700 is programmed to determine tunnel speed for a vehicle travelling through a tunnel as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of providing user interface navigation information associated with the availability of functions. Chip set or chip 700, or a portion thereof, constitutes a means for performing one or more steps of determining tunnel speed for a vehicle travelling through a tunnel.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 700 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to determine tunnel speed for a vehicle travelling through a tunnel. The memory 705 also stores the data associated with or generated by the execution of the inventive steps.

Figure 8:
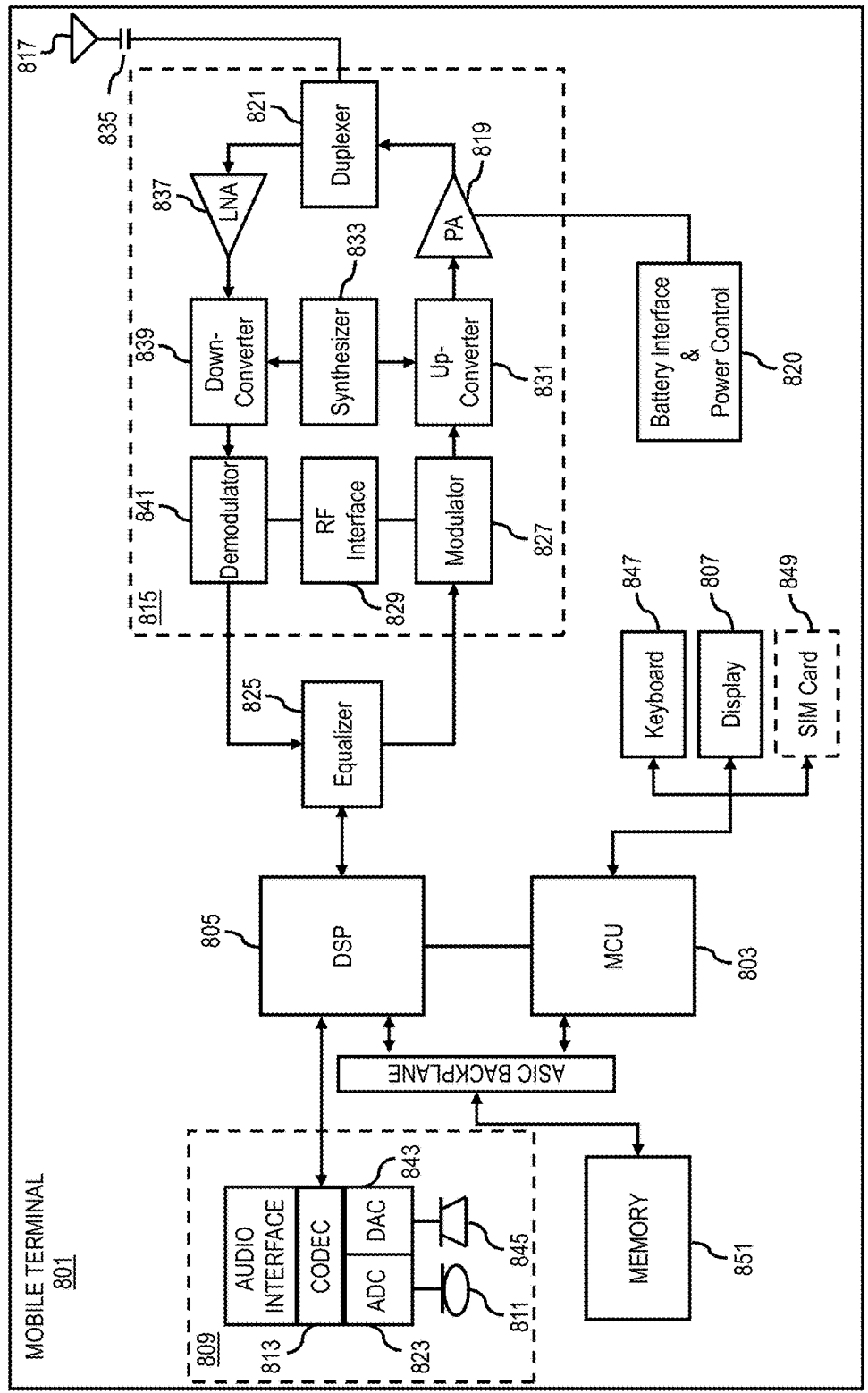
FIG. 8 is a diagram of a mobile terminal (e.g., handset) that can be used to implement an embodiment of the invention.

FIG. 8 is a diagram of exemplary components of a mobile terminal (e.g., handset) for communications, which is capable of operating in the system of FIG. 1, according to one embodiment. In some embodiments, mobile terminal 801, or a portion thereof, constitutes a means for performing one or more steps of determining tunnel speed for a vehicle travelling through a tunnel. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile terminal functions that perform or support the steps of determining tunnel speed for a vehicle travelling through a tunnel. The display 807 includes display circuitry configured to display at least a portion of a user interface of the mobile terminal (e.g., mobile telephone). Additionally, the display 807 and display circuitry are configured to facilitate user control of at least some functions of the mobile terminal. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile terminal 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803 which can be implemented as a Central Processing Unit (CPU).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile terminal 801 to determine tunnel speed for a vehicle travelling through a tunnel. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the terminal. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile terminal 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable storage medium known in the art. The memory device 851 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 849 carries, for instance, important information, such as the cellular phone number, the carrier supplying service, subscription details, and security information. The SIM card 849 serves primarily to identify the mobile terminal 801 on a radio network. The card 849 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for determining an estimated traffic congestion status of a tunnel, the method comprising:

causing, at least in part, an aggregation of probe data associated with at least one vehicle into at least one tunnel path based, at least in part, on a network geometry topology including the tunnel;

causing, at least in part, a designation of a location of at least one probe point of the tunnel path collected upstream of the at least one tunnel as a starting point of the at least one tunnel path, wherein a timestamp for the at least one probe point is a time at which the at least one probe point is collected and configured to be static data;

causing, at least in part, a designation of a location of at least one temporary probe point of the tunnel path as at least one endpoint of the at least one tunnel path, wherein the designated location of the at least one temporary probe point is located downstream of the tunnel, wherein a timestamp for the at least one temporary probe point is configured to be non-static data;

determining at least one temporary tunnel speed of the tunnel path based, at least in part, on the timestamp and designated location of the at least one probe point and the time stamp and designated location associated with the at least one temporary probe point;

causing a display of the at least one temporary tunnel speed on a display of a navigation device of the at least one vehicle while the at least one vehicle is in the at least one tunnel;

causing a display of actual speed of the at least one vehicle on the display of the navigation device of the at least one vehicle after the at least one vehicle exits the at least one tunnel; and determining an estimated traffic congestion status of the tunnel based, at least in part, on the determined at least one temporary tunnel speed.

2. The method of claim 1, further comprising:

determining that at least one actual probe point associated with the at least one vehicle has been collected downstream of the tunnel; and determining at least one real tunnel speed in place of the at least one temporary tunnel speed based, at least in part, on the at least one actual probe point.

3. The method of claim 1, further comprising:

causing, at least in part, an initiation of the determination of the estimated traffic congestion status if the at least one temporary tunnel speed crosses at least one threshold level.

4. The method of claim 1, further comprising:

determining congestion information associated with one or more upstream links, one or more downstream links, or a combination thereof, wherein the estimated traffic congestion status is further based, at least in part, on the congestion information.

5. The method of claim 1, further comprising:

causing, at least in part, a validation of the aggregation of the probe data into the at least one tunnel path by map-matching the probe data to the network geometry topology, one or more upstream links, one or more downstream links, the tunnel, or a combination thereof.

6. The method of claim 1, further comprising:

determining one or more upstream links, one or more downstream links, or a combination thereof associated with the at least one tunnel, wherein the one or more upstream links represents one or more upstream travel segments that is traveled to enter the tunnel and wherein the one or more downstream links represents one or more downstream travel segments that is traveled when exiting the tunnel; and causing, at least in part, a creation of the network geometry topology for the tunnel based, at least in part, on the one or more upstream links, the one or more downstream links, or a combination thereof.

7. The method of claim 1, further comprising:

causing, at least in part, a flagging of the one or more upstream links, the one or more downstream links, or a combination thereof in at least one mapping database to associate the one or more upstream links, the one or more downstream links, or a combination thereof with the tunnel.

8. The method of claim 7, wherein the flagging is based, at least in part, on at least one tunnel identifier associated with the tunnel.

9. The method of claim 1, wherein the aggregation of the probe data is persistent for a predetermined period of time; and wherein the temporary tunnel speed is determined continuously, periodically, according to a schedule, on demand, or a combination thereof.

10. An apparatus for determining an estimated traffic congestion status of a tunnel, the apparatus comprising:
at least one processor; and
at least one memory including computer program code for one or more programs,
the at least one memory and the computer program code configured to, with the at least one processor, cause the apparatus to perform at least the following,
cause, at least in part, an aggregation of probe data associated with at least one vehicle into at least one tunnel path based, at least in part, on a network geometry topology including the tunnel;
cause, at least in part, a designation of a location of at least one probe point of the tunnel path collected upstream of the at least one tunnel as a starting point of the at least one tunnel path, wherein a timestamp for the at least one probe point is a time at which the at least one probe point is collected and configured to be static data;
cause, at least in part, a designation of a location of at least one temporary probe point of the tunnel path as at least one endpoint of the at least one tunnel path, wherein the designated location of the at least one temporary probe point is located downstream of the tunnel,
wherein a timestamp for the at least one temporary probe point is configured to be non-static data;
determine at least one temporary tunnel speed of the tunnel path based, at least in part, on the timestamp and designated location of the at least one probe point and the time stamp and designated location associated with the at least one temporary probe point;
cause a display of the at least one temporary tunnel speed on a display of a navigation device of the at least one vehicle while the at least one vehicle is in the at least one tunnel;
cause a display of actual speed of the at least one vehicle on the display of the navigation device of the at least one vehicle after the at least one vehicle exits the at least one tunnel; and
determine an estimated traffic congestion status of the tunnel based, at least in part, on the determined at least one temporary tunnel speed.

11. The apparatus of claim 10, wherein the apparatus is further caused to:
determine that at least one actual probe point associated with the at least one vehicle has been collected downstream of the tunnel; and
determine at least one real tunnel speed in place of the at least one temporary tunnel speed based, at least in part, on the at least one actual probe point.

12. The apparatus of claim 10, wherein the apparatus is further caused to:

cause, at least in part, an initiation of the determination of the estimated traffic congestion status if the at least one temporary tunnel speed crosses at least one threshold level.

13. The apparatus of claim 10, wherein the apparatus is further caused to:
determine congestion information associated with one or more upstream links, one or more downstream links, or a combination thereof,
wherein the estimated traffic congestion status is further based, at least in part, on the congestion information.

14. The apparatus of claim 10, wherein the apparatus is further caused to:
cause, at least in part, a validation of the aggregation of the probe data into the at least one tunnel path by map-matching the probe data to the network geometry topology, one or more upstream links, one or more downstream links, the tunnel, or a combination thereof.

15. The apparatus of claim 10, wherein the apparatus is further caused to:
determine one or more upstream links, one or more downstream links, or a combination thereof associated with the tunnel, wherein the one or more upstream links represents one or more upstream travel segments that is traveled to enter the tunnel and wherein the one or more downstream links represents one or more downstream travel segments that is traveled when exiting the at least one tunnel; and
cause, at least in part, a creation of the network geometry topology for the tunnel based, at least in part, on the one or more upstream links, the one or more downstream links, or a combination thereof.

16. A non-transitory computer readable storage medium for determining an estimated traffic congestion status of a tunnel, the medium including one or more sequences of one or more instructions which, when executed by one or more processors, cause an apparatus to at least perform:
causing, at least in part, an aggregation of probe data associated with at least one vehicle into at least one tunnel path based, at least in part, on a network geometry topology including the tunnel;
causing, at least in part, a designation of a location of at least one probe point of the tunnel path collected upstream of the at least one tunnel as a starting point of the at least one tunnel path,
wherein a timestamp for the at least one probe point is a time at which the at least one probe point is collected and configured to be static data;
causing, at least in part, a designation of a location of at least one temporary probe point of the tunnel path as at least one endpoint of the at least one tunnel path,
wherein the designated location of the at least one temporary probe point is located downstream of the tunnel,
wherein a timestamp for the at least one temporary probe point is configured to be non-static data;
determining at least one temporary tunnel speed of the tunnel path based, at least in part, on the timestamp and designated location of the at least one probe point and the time stamp and designated location associated with the at least one temporary probe point;
causing a display of the at least one temporary tunnel speed on a display of a navigation device of the at least one vehicle while the at least one vehicle is in the at least one tunnel;

causing a display of actual speed of the at least one vehicle on the display of the navigation device of the at least one vehicle after the at least one vehicle exits the at least one tunnel; and determining an estimated traffic congestion status of the tunnel based, at least in part, on the determined at least one temporary tunnel speed.

17. The non-transitory computer readable storage medium of claim 16, wherein the apparatus is further caused to perform:

determining that at least one actual probe point associated with the at least one vehicle has been collected downstream of the tunnel; and determining at least one real tunnel speed in place of the at least one temporary tunnel speed based, at least in part, on the at least one actual probe point.

* * * * *